(12) United States Patent
Ishida (10) Patent No.: US 8,475,092 B2
(45) Date of Patent: Jul. 2, 2013

(54) CUTTING INSERT, CUTTING TOOL AND CUTTING METHOD USING THE SAME

(75) Inventor: Takuya Ishida, Higashiomi (JP)

(73) Assignee: KYOCERA Corporation, Kyoto (JP)

(*) Notice: Subject to any disclaimer, the term of this patent is extended or adjusted under 35 U.S.C. 154(b) by 424 days.

(21) Appl. No.: 12/994,299

(22) PCT Filed: Aug. 31, 2009

(86) PCT No.: PCT/JP2009/065193
§ 371 (c)(1),
(2), (4) Date: Nov. 23, 2010

(87) PCT Pub. No.: WO2010/024435
PCT Pub. Date: Mar. 4, 2010

(65) Prior Publication Data
US 2011/0070038 A1      Mar. 24, 2011

(30) Foreign Application Priority Data

Aug. 29, 2008   (JP) .................................. 2008-220924

(51) Int. Cl.
*B23C 5/20*        (2006.01)
(52) U.S. Cl.
CPC ...................................... *B23C 5/20* (2013.01)
USPC ................. 409/132; 407/114; 407/42; 407/61
(58) Field of Classification Search
CPC ...................................... B23C 5/20; B23C 5/16
USPC ............... 407/114, 115, 116, 113, 34, 42, 61; 409/131, 132
See application file for complete search history.

(56) References Cited

U.S. PATENT DOCUMENTS

| | | | | |
|---|---|---|---|---|
| 4,487,534 A * | 12/1984 | Reiter | ........................... | 407/114 |
| 5,282,703 A * | 2/1994 | Itaba et al. | ................... | 407/114 |
| 5,921,722 A * | 7/1999 | Paya et al. | ..................... | 407/114 |
| 2008/0260476 A1* | 10/2008 | Ishida | ........................... | 407/114 |
| 2009/0129874 A1* | 5/2009 | Craig | .............................. | 407/42 |
| 2010/0092253 A1* | 4/2010 | Ishida | ............................. | 407/42 |

FOREIGN PATENT DOCUMENTS

| | | |
|---|---|---|
| JP | 7-225908 | 8/1995 |
| JP | 2003-25135 | 1/2003 |
| JP | 2008-55600 | 3/2008 |
| WO | WO 2007-049617 | 5/2007 |

* cited by examiner

*Primary Examiner* — Daniel Howell
*Assistant Examiner* — Ryan Rufo (57) ABSTRACT

A cutting insert provided with an upper surface, side surfaces, and cutting edges provided at portions at which the upper surface and the side surfaces intersect with each other. Each side surface has grooves reaching the upper surface so as to divide the cutting edge into small cutting edges. Projections are provided on the upper surface at positions to which the grooves extend.

20 Claims, 8 Drawing Sheets

CUTTING INSERT, CUTTING TOOL AND CUTTING METHOD USING THE SAME

TECHNICAL FIELD

The present invention relates to a cutting insert and the like.

BACKGROUND ART

Conventionally, a rotating tool such as a face mill cutter, an end mill or the like, particularly a throw away type rolling tool structured such that a cutting insert is installed to a holder has been in heavy usage in terms of an economical efficiency.

A great load is applied to a rolling tool having a long cutting edge at a time of cutting. Accordingly, a cutting insert in which a cutting resistance applied at a time of cutting is reduced has been proposed.

For example, in patent document 1, there is disclosed a cutting insert provided with a cutting edge which is positioned on an intersection of an upper surface and a side surface, and a groove portion which is provided on the side surface in such a manner as to divide the cutting edge. In accordance with the structure mentioned above, a chip is divided finely in a width direction, and a cutting resistance applied at a time of cutting is reduced.

However, in the cutting insert, a plurality of chips divided finely in the width direction are generated, and there is a risk that a plurality of chips come into collision with each other. Accordingly, there has been demanded a structure which has an excellent chip discharging property as well as reducing a cutting resistance.

PRIOR ART PUBLICATION

Patent Publication
Patent Publication 1: Japanese Unexamined Patent Publication No. 07-225908

SUMMARY OF THE INVENTION

An object of the present invention is to provide a cutting insert, a cutting tool and a cutting method having an excellent chip discharging property as well as reducing a cutting resistance.

MEANS FOR SOLVING THE PROBLEM

In accordance with the present invention, there is provided a cutting insert comprising:
an upper surface;
a first side surface; and
a first cutting edge positioned on a first intersection in which the upper surface intersects the first side surface,
wherein a groove portion having an end portion reaching the upper surface exists on the first side surface, the first cutting edge is divided into two small cutting edges by the end portion of the groove portion, and a convex portion is positioned at an extension area through which the groove portion passes in the case of extending the groove portion on the upper surface in a longitudinal direction.

In accordance with the present invention, there is provided a cutting tool comprising:
a holder; and
the cutting insert according to any one of claims 1 to 12 which is installed to the holder,
wherein at least apart of the first cutting edge protrudes outward over an outer periphery of the holder.

In accordance with the present invention, there is provided a cutting method comprising:
a moving close step of relatively moving a workpiece close to the cutting tool according to claim 13 or 14;
a cutting step of cutting a surface of the workpiece by bringing the first cutting edge of the cutting tool which is rotated into contact with the surface of the workpiece; and
a separating step of relatively keeping the workpiece away from the cutting tool.

In accordance with the cutting insert and the cutting tool of the present invention, it is possible to inhibit a plurality of chips generated at a time of cutting from coming into collision with each other, by the convex portion provided in correspondence to the groove portion. Accordingly, the cutting insert in accordance with the present invention achieves an excellent chip discharging property as well as achieving a reduction of the cutting resistance applied at a time of cutting.

MODE FOR CARRYING OUT THE INVENTION

A description will be in detail given below of an embodiment in accordance with the present invention with reference to the accompanying drawings.

Cutting Insert

First Embodiment

Figure 1:
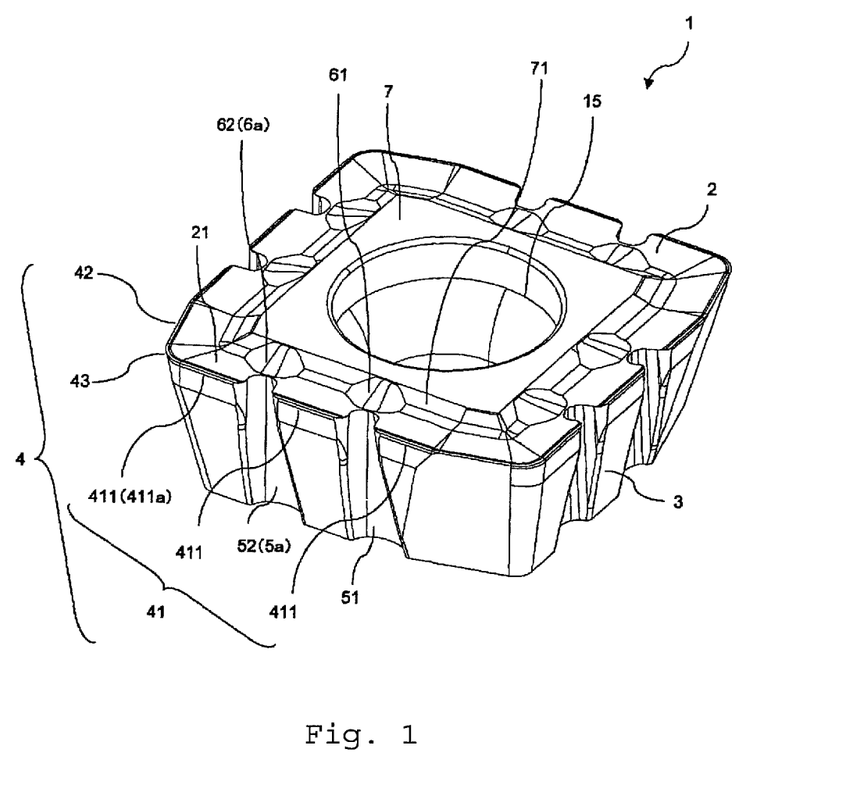
FIG. 1 is a general perspective view of a cutting insert in accordance with a first embodiment of the present invention.
Figure 2A:
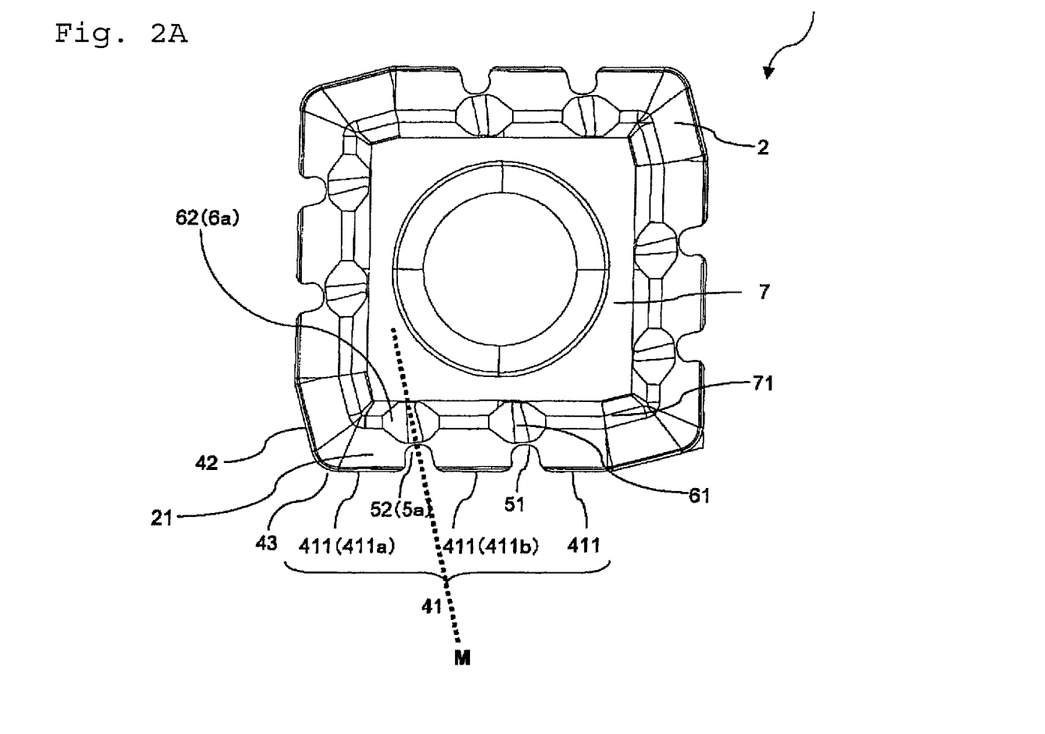
FIG. 2(a) is a plan view of a cutting insert 1 according to FIG. 1.
Figure 2B:
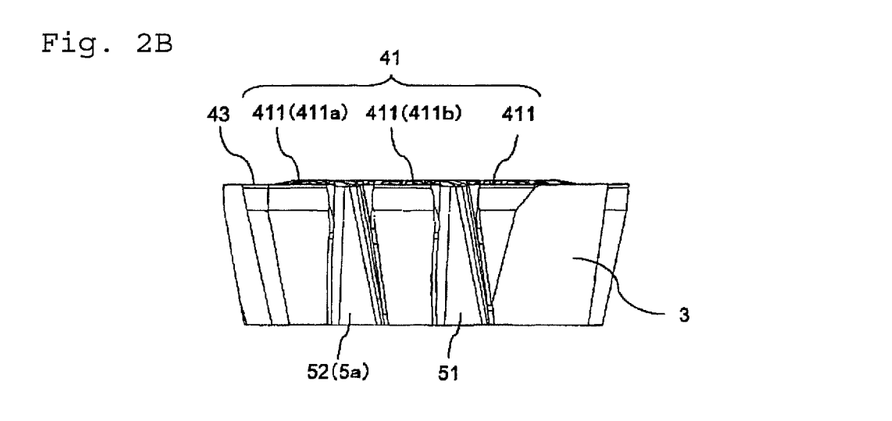
FIG. 2(b) is a side elevational view.
Figure 3:
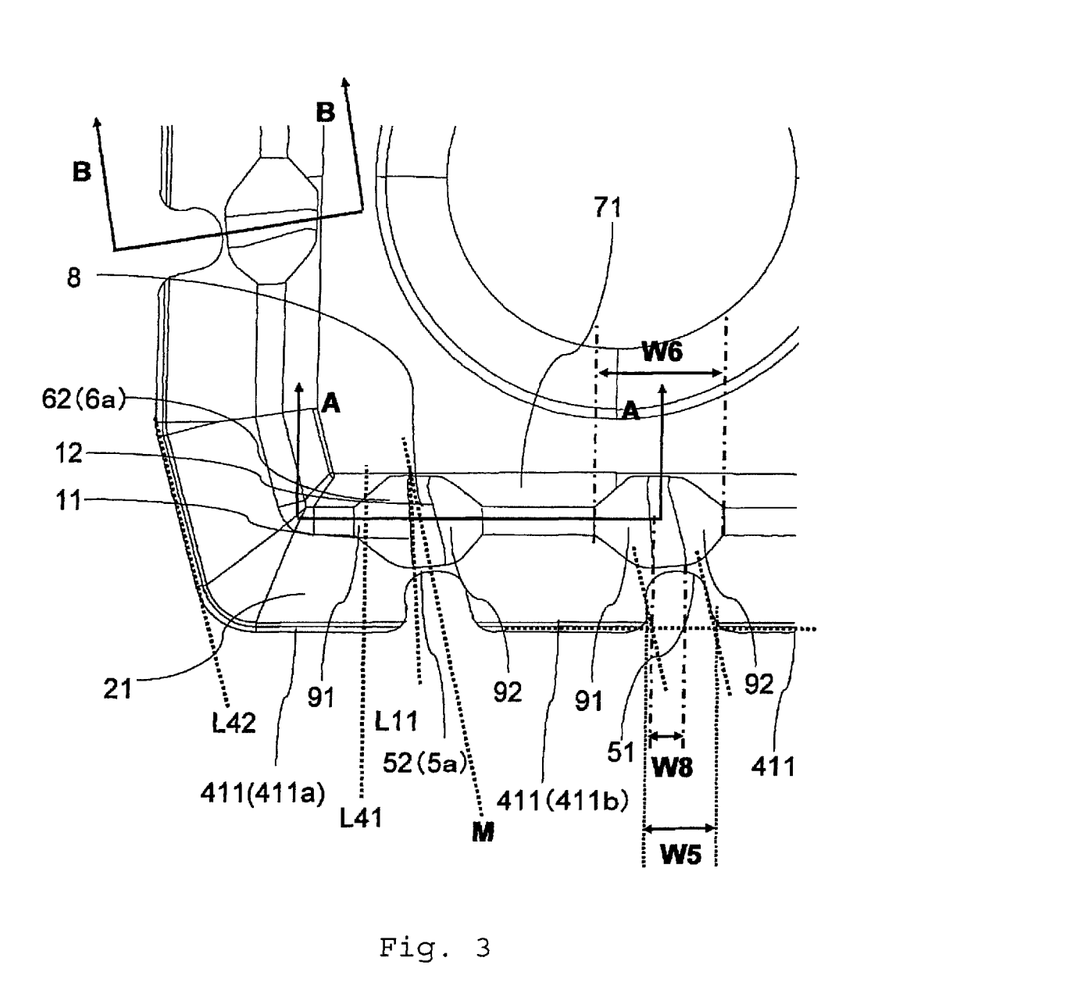
FIG. 3 is an enlarged view of a substantial part of FIG. 2(a)

FIGS. 1 to 3 show an embodiment in accordance with the present invention.

An insert 1 is provided with an upper surface 2, a side surface 3, and a cutting edge 4 provided on an intersection of the upper surface 2 and the side surface 3. The upper surface 2 is formed as an approximately polygonal shape, and is specifically formed as an approximately rectangular shape. Further, the insert 1 is provided with a rake face area 21 which is provided on the upper surface in such a manner as to extend inward from the cutting edge 4.

In the present embodiment, the cutting edge 4 has a first cutting edge 41, a second cutting edge 42, and a third cutting edge 43 connected to the first cutting edge 41 and the second cutting edge 42.

As shown in FIG. 2(a), the first cutting edge 41 is positioned at a first intersection in which the upper surface 2 intersects the first side surface 3. In other words, it is positioned on one side of the upper surface 2 forming an approximately rectangular shape. Further, the second cutting edge 42 is positioned on a second intersection in which the upper surface 2 intersects the second side surface 3. In other words, it is positioned on the other side which is adjacent to the one side of the upper surface 2. Further, the third cutting edge 43 is positioned on a corner portion (a third intersection) formed by the crossing of the one side and the other side.

In the present embodiment, a first cutting edge 41 and a second cutting edge 42 are arranged in such a manner as to form an obtuse angle in a top view. Specifically, an angle formed by a virtual extension line of the first cutting edge 41 and a virtual extension line of the second cutting edge 42 in the top view is an obtuse angle. The insert 1 can be applied to a face mill cutter by employing an arrangement of the cutting edges as mentioned above.

In the cutting tool mentioned below, the first cutting edge 41 serves as a main cutting edge, the second cutting edge 42 serves as an auxiliary cutting edge, and the third cutting edge 43 serves as a corner cutting edge.

In this case, in the present embodiment, the first cutting edge 41 is provided on each of sides of the upper surface 2 formed as the approximately rectangular shape. Accordingly, the insert 1 has four first cutting edges 41. Further, the second cutting edge 42 and the third cutting edge 43 are provided in correspondence to each of the four first cutting edges 41. In other words, the insert 1 has four second cutting edges 42 and four third cutting edges 43. In this case, four third cutting edges 43 are positioned respectively at four corner portions of the approximately rectangular shape.

Further, the insert 1 has a groove portion 5 and a convex portion 6.

As shown in FIGS. 1 and 2(b), the groove portion 5 is provided on the side surface 3 in such a manner as to divide the cutting edge 4 into a plurality of small cutting edges 411. In the present embodiment, the first cutting edge 41 is divided by two groove portions 5. In other words, the first cutting edge 41 is divided into three small cutting edges 411 by the two groove portions 5. As mentioned above, since the first cutting edge 41 is divided into three small cutting edges each having a short cutting edge length, a plurality of generated chips have a small width, in the insert 1. Accordingly, a load applied to the insert at a time of cutting becomes small. As a result, it is possible to achieve an excellent cutting performance even under a severer cutting condition.

Further, as shown in FIGS. 1 and 2(a), the convex portion 6 is formed on the upper surface 2 in such a manner as to correspond to the groove portion. Specifically, the convex portion 6 is formed on the rake face area 21 connecting to the first cutting edge and extending inward from the first cutting edge. Note that in the case where a land portion is formed on the first cutting edge, the land portion is included in the rake face area. In this case, the matter that "the convex portion 6 corresponds to the groove portion 5" means that the convex portion 6 is arranged on the upper surface 2 in such a manner as to satisfy the following two points.

The convex portion 6 is positioned inside the groove portion 5 on the upper surface 2.

At least a part of the convex portion 6 is positioned on a virtual straight line M passing the center in a width direction of the groove portion 5 and extending along an extension direction of the groove portion 5.

In the present embodiment, the convex portion 6 is formed along the virtual straight line M. In other words, it is positioned at an extension region through which the groove portion 5 passes in the case that it extends in its longitudinal direction, on the upper surface.

Meanwhile, the inner side in this case means a direction heading for the center side of the insert 1 with respect to the cutting edge 4 in the top view.

Further, as shown in FIG. 1, the convex portion 6 is positioned at a higher position than the rake face area 21. In other words, the convex portion 6 is provided so as to be protuberant upward from the rake face area 21 of the upper surface 2.

The insert 1 in accordance with the present embodiment can stabilize the chip discharging direction by the convex portion 6 structured as mentioned above, in such a manner as to prevent the chips each having the short width and generated by the small cutting edge 411 from coming into contact with each other. Accordingly, it is possible to suppress a damage of the cutting edge and the holder caused by a biting of the chips between the cutting edge ad the workpiece, a deterioration of a worked surface of the workpiece, a deterioration of a working precision and the like.

In other words, the chips generated by the small cutting blade 411 are curled along the rake face area 21 extending inward from the small cutting edge 411. At this time, the convex portion 6 is provided in the inner side of the groove portion 5, that is, in a direction in which the chips are discharged with respect to the groove portion 5. It is possible to inhibit the discharging direction of the chips which are divided finely in the width direction from deflecting right and left, by means of the convex portion 6. Accordingly, it is possible to inhibit the chips which are generated by the small cutting edge 411 from coming into collision with each other. As a result, it is possible to achieve an excellent chip discharging property.

Particularly, even in a cutting work mode in which a great load is applied at a time of the cutting work, such as an intermittent cutting, a high speed feeding work or the like, it is possible to achieve an excellent chip discharging property in addition to achieving a reduction of the chip resistance applied at a time of cutting.

Further, as shown in FIG. 3, the convex portion 6 has a pair of inclined side surfaces 91 and 92. The pair of inclined side surfaces 91 and 92 are inclined toward the rake face area 21 corresponding to each of the two small cutting edges 411 positioned on both ends of the groove portion 5 in the upper surface 2, from a top portion of the convex portion 6.

Specifically, a pair of inclined side surfaces is provided with the first inclined surface 91 which is positioned close to the third cutting edge 43 side, and the second inclined side surface 92 which is positioned in a side being away from the first inclined surface 91 with respect to the third cutting edge 43. The inclined side surfaces 91 and 92 are inclined in such a manner as to be positioned at a lower level as they come away from the virtual straight line M extending from the groove portion 5 mentioned above. In other words, the first inclined side surface 91 is inclined in such a manner as to be positioned at a lower level as it heads for the second cutting edge 42 from the top portion of the convex portion 6. On the other hand, the second inclined side surface 92 is inclined in such a manner as to be positioned at a lower level as it heads for an opposite side to the second cutting edge 42 with respect to the convex portion 6 from the top portion of the convex portion 6.

As mentioned above, since the convex portion 6 is provided with a pair of inclined side surfaces which are inclined toward the rake face area 21, on both sides of the virtual straight line M in which the groove portion 5 and the convex portion 6 extend, it is possible to inhibit the discharging direction of the chips formed by the small cutting edge 411 from deflecting right and left.

Further, the pair of inclined side surfaces 91 and 92 is provided in such a manner as to protrude from the respective corresponding groove portions 5 to the small cutting edge 411 side in the top view. In other words, a width W6 of the convex portion 6 is larger than a width W5 of the groove portion 5 in the top view. In accordance with the structure mentioned above, the chip generated by the small cutting edge 411 is first of all curled along the rake face area 21 extending inward from the small cutting edge 421. At this time, an end portion of the chip comes into contact with the inclined side surface of the convex portion 6, and the chip is deformed in such a manner that a cross sectional shape of the chip comes to a concave shape. Accordingly, it is possible to reduce the width of the chip generated by the small cutting edge 411 little by little as the chip is curled along the rake face area 21. As a result, an effect of inhibiting the adjacent chips from coming into collision with each other is enhanced.

In this case, the width W6 of the convex portion 6 is a maximum value in the dimension in the direction extending along the first cutting edge 41 of the convex portion 6 in the top view.

Further, the width W5 of the groove portion 5 means a distance between two crossing points of the virtual extension line of the wall surface of the groove portion 5 and the virtual extension line of the small cutting edge 411, as shown in FIG. 3. FIG. 3 exemplifies a width of a first groove 51 mentioned below. In this case, the wall surface of the groove portion 5 means a series of surfaces continuously connected to the rake face area 21 and the side surface 3. Note that, in the case that a whole of the wall surface of the groove portion 5 is constructed by a curved surface, as is different from the present embodiment in which the wall surface of the groove portion 5 has a flat surface, a tangential line of the curved surface may be set to the virtual extension line of the wall surface of the groove portion mentioned above.

Figure 4A:
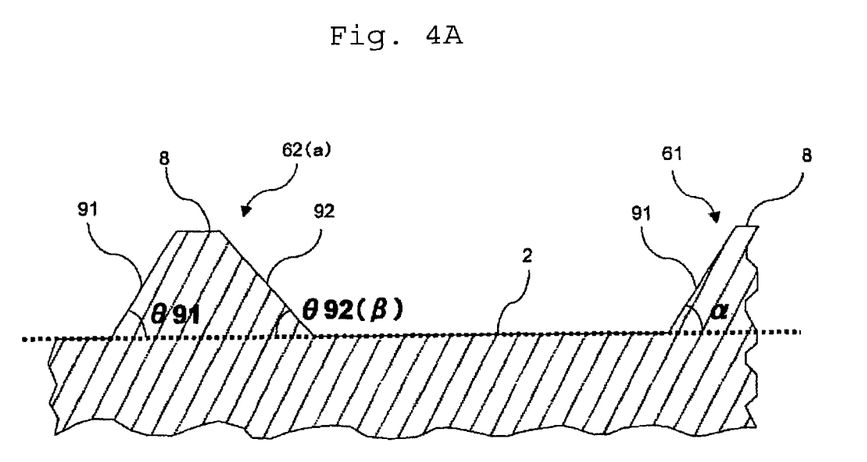
FIG. 4(a) is a cross sectional view along a line A-A according to FIG. 3.
Figure 4B:
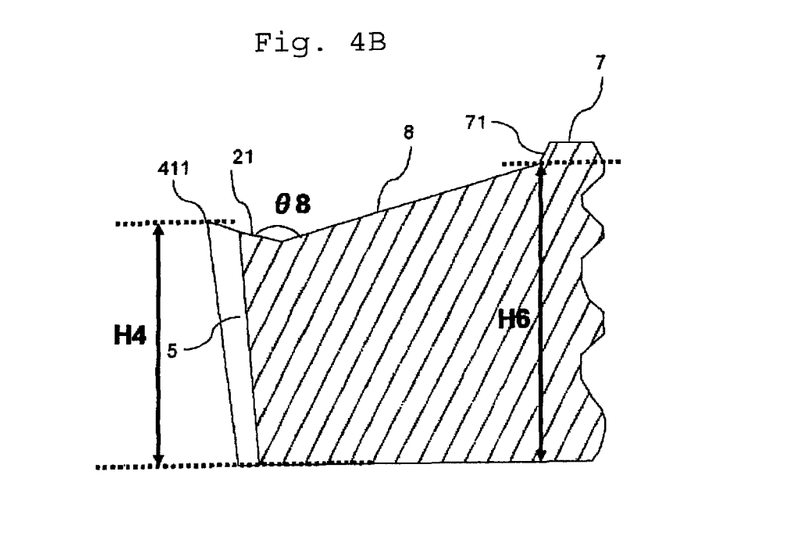
FIG. 4(b) is a cross sectional view along a line B-B in FIG. 3.

Further, as shown in FIG. 4, an angle of gradient θ91 of the first inclined side surface 91 may be identical to an angle of gradient θ92 of the second inclined side surface 92; however, it is desirable that the angle of gradient θ91 of the first inclined side surface 91 is larger than the angle of gradient θ92 of the second inclined side surface 92 (θ91>θ92). In the case that θ91 and θ92 satisfy the relationship mentioned above, it is possible to combine an effect that the first inclined side surface 91 positioned close to the third cutting edge 43 side with which the generated chip is more likely to come into contact stabilizes the chip discharging direction, and an effect that the second inclined side surface 92 with which the generated chip is less likely to come into contact enhances a strength of the upper surface 2, with a good balance.

Particularly, in the case that the insert 1 is installed to a holder while having a positive axial rake, the small cutting edge 411 is going to come into contact with the workpiece from the third cutting edge 43 side sequentially. Accordingly, the chip generated by the small cutting edge 411 is discharged in such a manner as to be pushed up from the third cutting edge 43 side coming into contact with the workpiece in advance. Accordingly, the discharging direction of the chip mentioned above is not a direction which is approximately vertical to the first cutting edge 41, but tends to be deviated in a direction in which it comes away from the third cutting edge 43 toward the inner side with respect to the direction. Even in the case mentioned above, since θ91 and θ92 satisfy the relationship mentioned above, it is possible to preferably achieve a curl function and a guide function.

The angles of gradient θ91 and θ92 in this case each mean an angle at which the first inclined side surface 91 or the second inclined side surface 92 is inclined with respect to the lower surface, in a cross sectional view approximately in parallel to the first cutting edge 41 by which the maximum width W6 of the convex portion 6 can be obtained.

Meanwhile, the matter "the top portion of the convex portion 6 is positioned at a higher position than the cutting edge 4" in this case means the matter that the top portion of the convex portion 6 is positioned at higher position than the cutting edge 4, on the basis of the lower surface of the insert 1. Specifically, it means that a distance H6 between the lower surface and the top portion of the convex portion 6 is larger than a distance H4 between the lower surface and the cutting edge 4. Further, the top portion of the convex portion 6 means a portion which is positioned at the highest level in the convex portion 6. Therefore, H6 means a maximum value in the distance between the lower surface and the convex portion 6. Further, in the same manner, in the case that the cutting edge 4 is constructed by an inclined cutting edge, H4 means a maximum value in the distance between the lower surface and the cutting edge 4.

Further, a breaking groove 71 is formed on the upper surface 2. The breaking groove 71 is formed inside the rake face area 21 and at a position which is away from the small cutting edge 411 than the convex portion 6. Further, the breaking groove 71 is inclined in such a manner as to be positioned at a higher position toward the inner side. The breaking groove 71 is arranged in such a manner as to be opposed to the small cutting edge 411. In accordance with the structure mentioned above, the breaking groove 71 can stably further curl the chip which is generated by the small cutting edge 411 and is curled along the rake face area 21, and can cut the chip in the longitudinal direction.

More specifically, the rake face area 21 extending toward the inner side from the small cutting edge 411 and the breaking groove 71 can achieve a breaker function, while a pair of side surfaces can achieve a guide function of stabilizing the chip discharging direction. Since the breaking groove 71 is provided as mentioned above, it is possible to preferably combine the breaker function and the guide function.

Furthermore, the breaking groove 71 is connected to the inner side of the convex portion 6. In accordance with the structure mentioned above, it is possible to improve a strength of an area in which a strength of the upper surface 2 is lowered by the formation of the groove portion 5. In other words, the convex portion 6 serves as a reinforcing portion of the upper surface 2, in the area mentioned above. Accordingly, it is possible to suppress a defect of the rake face area 21 and the groove portion 5 which tend to get chipped. As a result, it is possible to achieve an improvement of a tool service life.

Further, the convex portion 6 has an inclined center surface 8 which is positioned between a pair of inclined side surfaces 91 and 92. It is preferable that the inclined center surface 8 is constructed by a flat surface extending toward the inner side from the groove portion 5 side. Further, the inclined center surface 8 is inclined in such a manner as to be positioned at a higher position as it comes away from the groove portion 5. Since the inclined center surface 8 mentioned above is provided, it is possible to achieve an improvement of the chip discharging property as well as it is possible to achieve an improvement of a strength of the rake face area 21.

In this case, it is sufficient that at least a part of the inner side of the convex portion 6 is connected to the breaking groove 71. In the present embodiment, as shown in FIG. 4, the inclined center surface 8 of the convex portion 6 is connected to the breaking groove 71. Accordingly, the function that the convex portion 6 guides the chip is enhanced.

Further, in the present embodiment, a center portion 7 is provided on the center of the upper surface 2. The center portion 7 is positioned at a higher position than the rake face area 21. The breaking groove 71 is arranged on a surface which is opposed to the small cutting edge 411 of the center portion 7. Specifically, in the present embodiment, the breaking groove 71 corresponds to a surface which is positioned closest to the small cutting edge 411 in the center portion 7. Therefore, in the present embodiment, the inner side of the convex portion 6 is connected to the center portion 7. In other words, the convex portion 6 serving as the reinforcing portion as mentioned above is formed so as to be integrated with the center portion 7. In accordance with the structure mentioned above, the strength of the upper surface 2 is further enhanced. Accordingly, it is possible to suppress the defect of the cutting edge 4 starting from the vicinity of the groove portion 5.

Meanwhile, in the present embodiment, a through hole penetrating from the upper surface 2 to the lower surface is formed in the center portion 7 of the insert 1. The through hole 15 is a hole to which a screw is inserted at a time of screw fastening to the holder. The center portion 7 is provided on an outer periphery of the through hole 15, and is formed approximately as a rectangular shape in the top view, in the present embodiment. Further, an upper surface of the center portion 7 is formed as a flat surface which is approximately in parallel to the lower surface. In accordance with the structure mentioned above, it is possible to improve the strength of the upper surface 2.

It is preferable that an angle θ8 formed by the inclined center surface 8 and the rake face area 21 is between 135 degree and 165 degree. In accordance with the structure mentioned above, the convex portion 6 can preferably achieve the guide function as well as it is possible to suppress a clogging of the chips in an area between the convex portion 6 and the groove portion 5.

In this case, the angle θ8 formed by the inclined center surface 8 and the rake face area 21 can be defined by a cross section which passes through the center in the width direction of the groove portion 5 and is approximately in parallel to the extending direction of the groove portion 5, as shown in FIG. 4(b). The extending direction of the groove portion 5 here means a direction which is approximately in parallel to a wall surface in the top view in the case where the groove portion 5 has a flat wall surface such as in the case of the present embodiment. Further, in the case where the groove portion 5 does not have the flat wall surface, it means an extending direction of a line connecting the center in the width direction in the end portion in the cutting edge 4 side of the groove portion 5 to the center in the width direction in the end portion in the inner side of the groove portion 5.

Further, the inclined center surface 8 is constructed by the flat surface in the present embodiment; however, is not limited to the embodiment, but may be constructed by a curved surface. In this case, in the embodiment in which the inclined center surface 8 is formed as the flat surface, a strength of the insert 1 is high.

In this case, in the present embodiment, the inclined center surface 8 is provided on the upper surface 2 so as to be away from the groove portion 5. Accordingly, the strength of the upper surface 2 of the insert 1 is improved, and it is possible to inhibit the insert 1 from chipping starting from the vicinity of the groove portion 5. Further, it is possible to suppress the chip at a time of manufacturing the insert 1, and a yield ratio is improved.

Further, in the present embodiment, the top portion of the convex portion 6 is positioned at a higher position than the cutting edge 4. Accordingly, it is possible to inhibit the chip generated by the small cutting edge 411 from running on the convex portion 6. As a result, the effect of inhibiting the adjacent chips from coming into collision with each other is enhanced.

Further, as shown in FIG. 3, a width W8 close to the groove portion 5 of the inclined center surface 8 is smaller than the width W5 of the groove portion 5 in the top view. Accordingly, it is possible to smoothly curl the chip generated by the small cutting edge 411 along the rake face area 21. In other words, it is possible to inhibit the chip generated by the small cutting edge 411 from strongly coming into collision with the convex portion 6 and inhibit the discharging direction of the chip from becoming unstable. Therefore, it is possible to inhibit the chip from being clogged between the groove portion 5 and the inclined center surface 8 so as to scrape the worked wall surface, and a working precision is improved.

In this case, the width 8 close to the groove portion 5 of the inclined center surface 8 is a value of a width of the inclined center surface 8 which is calculated by the same method as the width W8 of the inclined center surface 8 mentioned above, in the end portion closest to the groove portion 5 in the inclined center surface 8. Further, the width W5 of the groove portion 5 is a maximum value in the dimensions in the direction extending along the first cutting edge 41 of the groove portion 5 in the top view.

In this case, in the present embodiment, the width of the inclined center surface 8 is the smallest in the groove portion 5 side, and is reduced toward the inner side. A shape of the inclined center surface 8 is not limited to the embodiment, but may be structured such that a fixed width is given as it heads for the inner side from the groove portion 5 side, or may be structured such that the width is increased toward the inner side from the groove portion 5 side.

Further, it is preferable that an angle formed by at least one of the first inclined side surface 91 and the second inclined side surface 92 and the inclined center surface 8 is an obtuse angle. In the present embodiment, as shown in FIG. 4(a), both the first inclined side surface 91 and the second inclined side surface 92 form an obtuse angle with respect to the inclined center surface 8. In accordance with the structure mentioned above, an improvement of the strength of the convex portion 6 itself can be achieved, as well as an improvement of the strength of the upper surface 2 can be achieved. Accordingly, it is possible to inhibit the insert 1 from chipping at a time of cutting.

In this case, it is preferable that the first inclined side surface 91 and the second inclined side surface 92 are each constructed by a flat surface. Accordingly, a chip guide function becomes preferable.

Further, as mentioned above, in the present embodiment, three groove portions 5 dividing the first cutting edge 41 are provided. In this case, as shown in FIG. 3, the groove portion 5 positioned closest to the third cutting edge 43 among a plurality of groove portions 5 is set to a corner groove portion 5a. The corner groove portion 5a is a groove portion 5 which is adjacent to a small cutting edge 411a connected to the first cutting edge 41.

In the case that the groove portion 5 is the corner groove portion 5a which is provided on the third cutting edge 43 side serving as a corner cutting edge as mentioned above, it is preferable that it is constructed as follows.

In other words, the convex portion corresponding to the corner groove portion 5a is set to a corner convex portion 6a. At this time, the corner convex portion 6a has a first edge portion 11 and a second edge portion 12 which extend to the inner side from the groove portion 5, in the top view. The first edge portion 11 is positioned closer to the second cutting edge 42 side than the second edge portion 12.

Further, the first edge portion 11 is arranged so as to come away from the second cutting edge 42 as it heads for the inner side from the groove portion 5, in the top view. In other words, a virtual extension line L11 of the first edge portion 11 and a virtual extension line L42 of the second cutting edge 42 are arranged so as to come away from each other as they head for the inner side from the small cutting edge 411, in the top view. Specifically, a distance between the first edge portion 11 and the second cutting edge 42 (a distance between L11 and L42) becomes minimized in the small cutting edge 411 side, and becomes maximized in the inner side, in the top view.

A chip generated by the small cutting edge 411a connected to the third cutting edge 43 is generated integrally with the chip generated by the third cutting edge 43. Accordingly, the chip generating direction is affected by the corner portion of the third cutting edge 43, and is deviated to a direction of coming away from the third cutting edge 43 as it heads for the inner side with respect to a direction (L41) which is approximately vertical to the first cutting edge 41.

Accordingly, it is possible to inhibit the chip having the generating direction as mentioned above and generated by the small cutting edge 411a connected to the third cutting edge 43 from energetically coming into collision with the convex portion 6, by setting the arrangement of the first edge portion 11 and the second edge portion 12 to the above. Therefore, it is possible to inhibit a great friction resistance from being generated between the chip and the convex portion 6 at a time of cutting. As a result, it is possible to smoothly discharge the chip.

In this case, in the case that the insert 1 is installed to the holder while having a positive axial rake as mentioned above, the generating direction of the chip mentioned above is further largely deviated at that degree. Accordingly, in the case that the insert 1 is used by being installed to the holder while having the positive axial rake, it is preferable that they are arranged so as to come away largely as L42 and L11 head for the inner side. In other words, it is preferable to make an angle of gradient of L112 with respect to L42 large.

Further, it is desirable that the following structure is satisfied in the two groove portions 5 positioned on both ends of one small cutting edge 411, among a plurality of groove portions 5. Here, a description will be given by exemplifying a small cutting edge 411b positioned in adjacent to the small cutting edge 411a connected to the third cutting edge 43, as one small cutting edge 411.

First of all, among a plurality of groove portions 5, the groove portion 5 which is adjacent to one end of the small cutting edge 411b of the two groove portions 5 positioned on both ends of the small cutting edge 411b is set to a first groove portion 51. Further, the groove portion 5 which is adjacent to the other end of the small cutting edge 411b is set to a second groove portion 52. Then, the second groove portion 52 is positioned closer to the third cutting edge 43 side than the first groove portion 51.

In this case, the second groove portion 52 positioned close to the third cutting edge 43 side corresponds to the corner groove portion 5a mentioned above.

The rake face area 21 is provided with a first convex portion 61 and a second convex portion 62, respectively, in correspondence to the first groove portion 51 and the second groove portion 52. Further, the first convex portion 61 and the second convex portion 62, respectively, have the first inclined side surface 91 and the second inclined side surface 92 as mentioned above. The first and second inclined side surfaces 91 and 92 are positioned on both sides of each of the inclined center surfaces 8. In this case, the adjacent first convex portion 61 and second convex portion 62 are away from each other, and are structured such as not to obstruct the flow of the chip generated from the small cutting edge. In other words, the rake face area 21 is arranged between the convex portions. More specifically, the convex portion is not arranged on a vertical bisector of the small cutting edge.

Further, in the present embodiment, as shown in FIG. 4(*a*), an angle of gradient α of the first inclined side surface 91 in the first convex portion 61 is larger than an angle of gradient β of the second inclined side surface 92 in the second convex portion 62. In accordance with the structure mentioned above, the angle of gradient of the inclined side surface of the convex portion is sharp on an end portion positioned in an opposite side to the third cutting edge 43 with respect to the small cutting edge 411b of both ends of the small cutting edge 411b, and the angle of gradient of the convex portion is gentle on an end portion positioned close to the third cutting edge 43 side with respect to the small cutting edge 411b. Accordingly, it is possible to enhance the guide function of the convex portion on the end portion positioned in the opposite side to the third cutting edge 43 of both ends of the small cutting edge 411, and it is possible to enhance the curl function of the convex portion on the end portion positioned close to the third cutting edge 43 side of both ends of the small cutting edge 411.

Accordingly, it is possible to stabilize the discharging direction of the chip generated by the small cutting edge 411b in which both ends are pinched by the groove portions 5. Therefore, it is possible to enhance an effect of inhibiting the chip generated by the small cutting edge 411a and generated integrally with the chip generated by the first cutting edge 41, and the chip generated by the small cutting edge 411b in which both ends are pinched by the groove portions 5, from coming into collision with each other.

Second Embodiment

Figure 5:
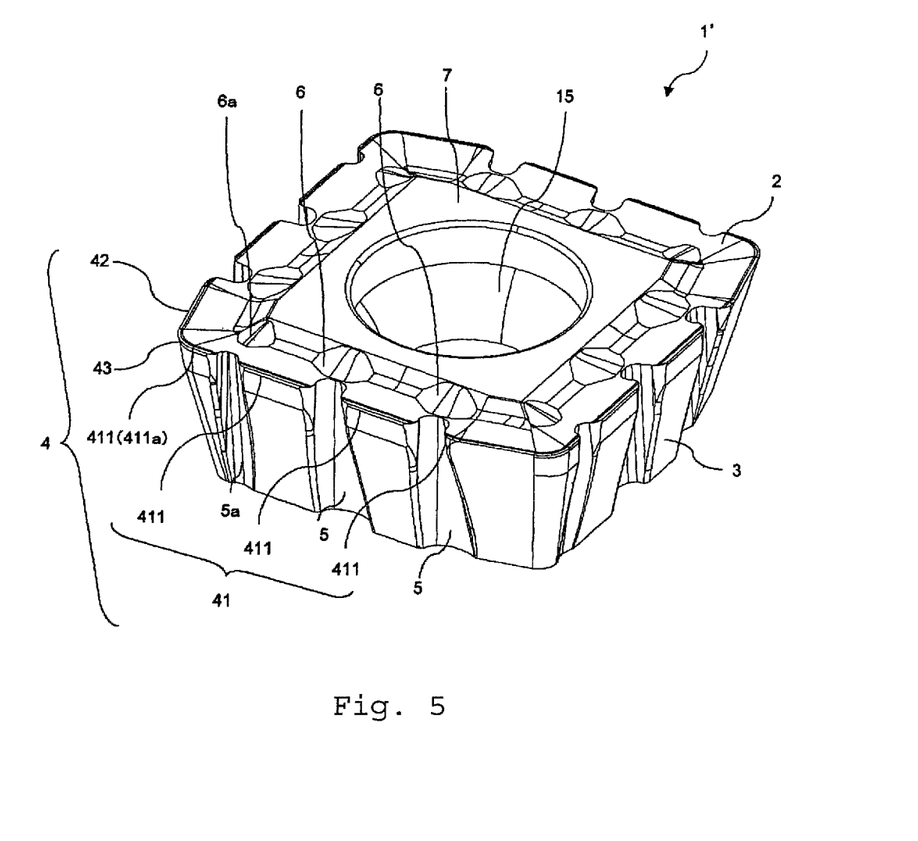
FIG. 5 is a general perspective view of a cutting insert in accordance with a second embodiment of the present invention.
Figure 6A:
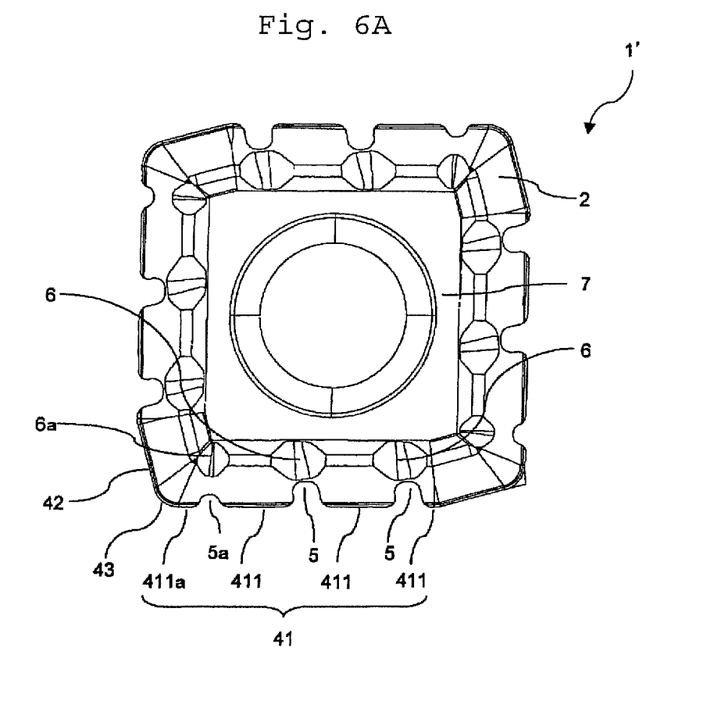
FIG. 6(a) is a plan view of a cutting insert 1' according to FIG. 5.
Figure 6B:
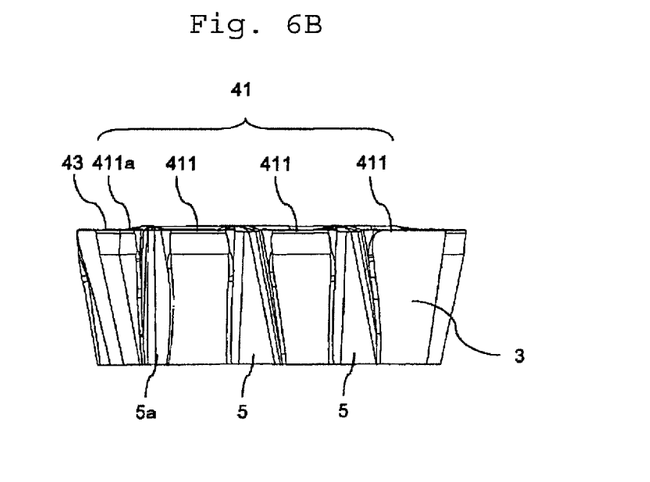
FIG. 6(b) is a side elevational view.

As shown in FIGS. 5 and 6, the number of the groove portions 5 dividing the first cutting edge 41 is different between an insert 1' in accordance with the present embodiment and the insert 1 in accordance with the first embodiment. Specifically, the number of the groove portions 5 dividing the first cutting edge 41 is two in the insert 1, while is three in the insert 1'. In other words, the first cutting edge 41 is divided into four small cutting edges 411 in the insert 1'.

In the present embodiment, the distance between the corner groove portion 5a positioned closest to the third cutting edge 43 among three groove portions 5 and the third cutting edge 43 becomes smaller in comparison with the insert 1 in accordance with the first embodiment. In other words, the corner groove portion 5a in accordance with the present embodiment is provided in such a manner as to be positioned closer to the third cutting edge 43 than the corner groove portion 5a in the first embodiment mentioned above.

Further, in the first embodiment mentioned above, the two groove portions 5 including the corner groove portion 5a is approximately the same in size, however, the corner groove portion 5a is smaller in comparison with the other two groove portions 5, in the present embodiment. In other words, in the first embodiment, the width and the depth of two groove portions 5 including the corner groove portion 5a are approximately the same in the top view; however, the width and the depth of the corner groove portion 5a are smaller than those of the other two groove portions 5, in the present embodiment.

Accordingly, in the present embodiment, the convex portion 6a corresponding to the corner groove portion 5a is formed so as to be smaller in comparison with the other two convex portions 6. Specifically, a width of the convex portion 6a itself, and widths of the inclined center surface 8 of the convex portion 6a and a pair of inclined side surfaces 91 and 92 are each smaller than those of the other two convex portions 6.

It is possible to enhance a strength of the rake face area 21 in the vicinity of the third cutting edge 43, by setting the corner groove portion 5a which is adjacent to the small cutting edge 411a connected to the third cutting edge 43 and the convex portion 6a corresponding to the groove portion 5a smaller than the other groove portions 5 or convex portions 6, as mentioned above. Therefore, it is possible to inhibit the third cutting edge 43 to which a very great load is applied from chipping, since it is the cutting edge portion first coming into contact with the workpiece at a time of cutting.

As mentioned above, in the inserts 1 and 1' in accordance with two embodiments of the present invention, there is exemplified the insert in which the upper surface 2 is formed as the approximately square shape and four corners can be used as mentioned above; however, the insert is not limited to this, but the upper surface may be formed as the other shapes such as a rhomboid shape, a triangular shape and the like. In this case, since a reduction of a working cost can be achieved, it is desirable to use a plurality of corners such as the present embodiment.

Further, in the embodiment mentioned above, there is exemplified the embodiment in which two or three groove portions 5 each dividing the third cutting edge 43 are formed; however, the number of the groove portions 5 dividing the third cutting edge 43 may be set to one or more. In other words, the number of the groove portions 5 dividing the third cutting edge 43 can be appropriately selected in correspondence to the cutting length and the cutting condition of the third cutting edge.

Further, with regard to the shape of the groove portion 5, in the embodiment mentioned above, there is exemplified the embodiment in which the groove portion 5 is formed so as to reach the lower surface from the upper surface; however, the structure is not limited to this, but may be made such that the lower end of the groove portion is positioned on the side surface 3.

Further, in the embodiment mentioned above, there is exemplified the embodiment in which the number of the convex portion 6 provided in correspondence to the groove portion 5 is one; however, the structure is not limited to this, but may be made such that a plurality of convex portions 6 are provided in correspondence to one groove portion 5. For example, the structure may be made such that a plurality of convex portions 6 are provided front and rear side by side in the rake face area 21 positioned in the inner side of the groove portion 5, or may be made such that a plurality of convex portions 6 are provided right and left side by side in the rake face area 21 positioned in the inner side of the groove portion 5.

Further, in the embodiments mentioned above, there is exemplified the embodiment having the flat inclined center surface 8 extending toward the inner side from the groove portion 5 side in the center of the convex portion 6; however, the shape of the convex portion 6 is not limited to this. For example, it may be an approximately semispherical convex portion 6 constructed by a convex curved surface. Further, it may be a convex portion 6 having approximately the same surface as the upper surface of the center portion 7. In other words, the convex portion 6 may be formed as far as it protrudes upward from the rake face area 21 in such a manner that the chip generated by the small cutting edge 411 is stably curled by the rake face area 21, or by the rake face area 21 and the breaking groove 71.

Cutting Tool

Figure 7:
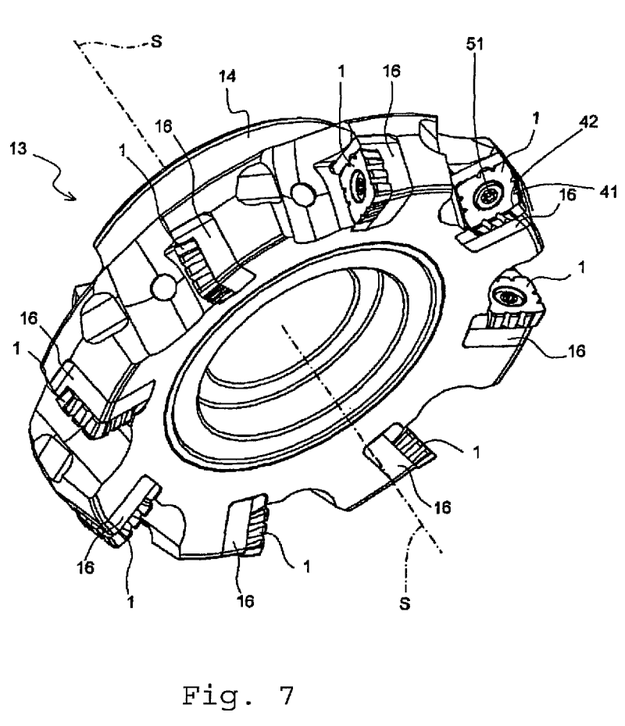
FIG. 7 is a general perspective view of a cutting tool 13 in accordance with an embodiment of the present invention; and
FIG. 8(a), FIG. 8(b)

A cutting tool 13 is structured, as shown in FIG. 7, such that the insert 1 mentioned above is installed to a leading end of the holder 14. In the present embodiment, the holder 14 is formed as a rod shape, specifically as a columnar shape. Further, the holder 14 has eight insert pockets 12 to which the insert 1 is installed. Accordingly, the cutting tool 1 is provided with eight inserts 1.

Installed to the insert 1 is the first cutting edge 41 serving as a main cutting edge in such a manner as to protrude outward from an outer peripheral surface of the holder 14. Further, the second cutting edge 42 serving as an auxiliary cutting edge is installed in such a manner as to protrude from a leading end surface of the holder 14. Further, at this time, the second cutting edge 42 is arranged so as to be approximately vertical to an axis S of the holder 14. In this case, in the insert 1 in accordance with the present embodiment, the first cutting edge 1 is arranged so as to be inclined in such a manner as to come away from a leading end toward a trailing end, with respect to the axis S of the holder 14.

Since the cutting tool 13 is structured such as to be provided with the insert 1 mentioned above, it is possible to inhibit a plurality of chips divided finely in the width direction from coming into collision with each other. Accordingly, the chip discharging characteristic is improved and an improvement of a tool service life can be achieved.

In this case, in the present embodiment, the insert 1 is installed to the holder 14 via a seat member 16. In accordance with the structure mentioned above, it is possible to reduce the chip of the holder 14 portion positioned in the chip portion of the cutting edge 4, in the case that the chip of the cutting edge 4 of the insert 1 is generated. Therefore, it is possible to make a service life of the holder 14 long.

In this case, in the present embodiment, the insert 1 is screw fastened to the holder 14 by a thread member 51.

Further, it is preferable that the insert 1 is installed to the holder 14 while having a positive axial rake. Accordingly, it is possible to achieve a further reduction of the cutting resistance. Therefore, it is possible to achieve an excellent cutting performance even under a severer cutting condition particularly such as a heavy cutting work having a great depth of cut.

In this case, in the present embodiment, there is exemplified the embodiment in which the seat member is interposed between the insert 1 and the holder 14, at a time of installing the insert 1 to the holder 14, while the structure may be made such that the insert 1 is directly brought into contact with the holder 1.

Further, in the cutting tool in accordance with the present embodiment, the face mill cutter is exemplified, but the cutting tool can be applied to an end mill or the like without being limited to this.

Cutting Method

Finally, a description will be given of a cutting method of a workpiece in accordance with an embodiment of the present invention with reference to FIGS. 8(a) to 8(c) by exemplifying the case that the rolling tool (the cutting tool 13) mentioned above is used.

The cutting method of the workpiece in accordance with the present embodiment is provided with the following steps (i) to (iii).

Figure 8A:
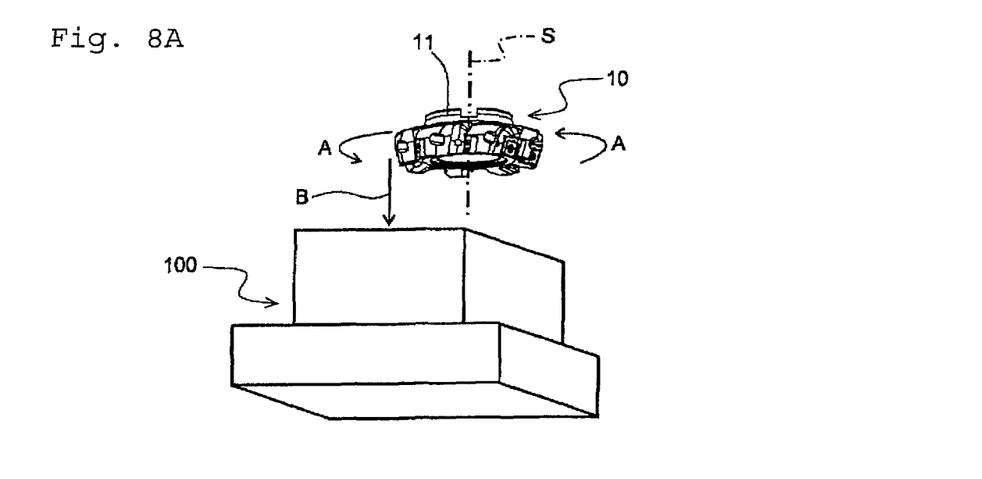

(i) an step of moving the cutting tool 13 close to a workpiece 100 by rotating the cutting tool 13 in a direction of an arrow A around the axis S of the holder 14 and moving it in a direction of an arrow B, as shown in FIG. 8(a).

Figure 8B:
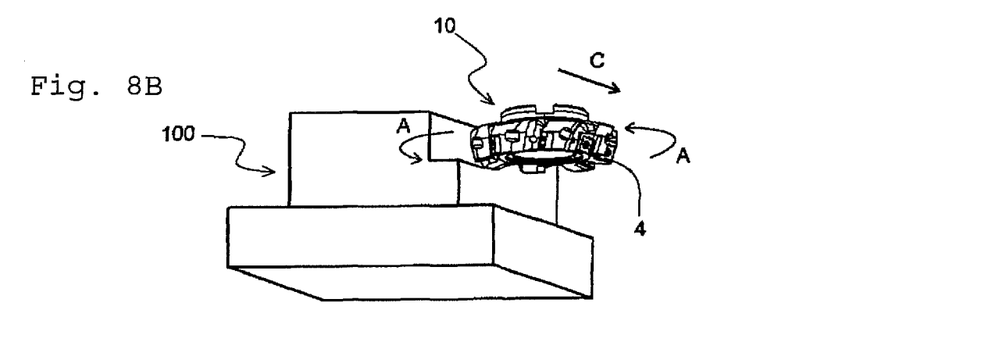

(ii) a step of cutting a surface of the workpiece 100 by bringing the cutting edge 4 of the insert 1 into contact with the surface of the workpiece 100, and moving the cutting tool 13 in a direction of an arrow C, as shown in FIG. 8(b).

Figure 8C:
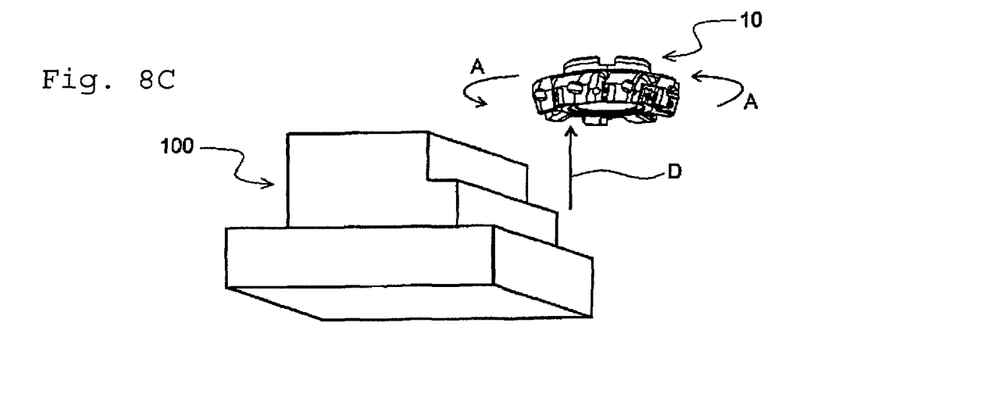
FIG. 8(c) is a process chart illustrating a cutting method of a workpiece in accordance with an embodiment of the present invention.

(iii) a step of keeping the cutting tool 13 away from the workpiece 100 by moving the cutting tool 13 in a direction of an arrow D, as shown in FIG. 8(c).

Accordingly, as mentioned above, since the excellent chip discharging characteristic is provided, and the material is worked by using the cutting tool 13 having a long tool service life, it is possible to achieve an improvement of a working efficiency and a finished surface precision. In other words, it is possible to inhibit the chip generated by the small cutting edge 411 from being clogged between the workpiece and the cutting tool 13, and it is possible to suppress the chip of the cutting edge 4 and the groove portion 5. As a result, it is possible to stably carry out the cutting work having a high working precision for a long term.

In this case, in the step (i) mentioned above, at least one of the cutting tool 13 and the workpiece 100 may be rotated. Further, the cutting tool 13 and the workpiece 100 may relatively come close, for example, the workpiece 100 may be moved close to the cutting tool 13. In the same manner, in the step (iii) mentioned above, the workpiece 100 and the cutting tool 13 may relatively come away, for example, the workpiece 100 may be moved away from the cutting tool 13. In the case of carrying over the cutting work, the step of bringing the cutting edge 4 of the insert 1 into contact with different positions of the workpiece 100 may be repeated while keeping the state in which the cutting tool 13 and/or the workpiece 100 are rotated. When the used cutting edge wears, an unused cutting edge may be used by rotating the insert 1 with respect to the center axis of the through hole 15.

The embodiments in accordance with the present invention are exemplified above, however, it goes without saying that the present invention is not limited to the embodiments, but may be optionally structured without departing from the purpose of the invention.

The invention claimed is:

1. A cutting insert, comprising:
an upper surface;
a first side surface; and
a first cutting edge located at a first intersection of the upper surface and the first side surface,
wherein the first side surface comprises a groove portion comprising an end portion reaching the upper surface, the end portion of the groove portion configured to divide the first cutting edge into two small cutting edges, and
wherein the upper surface comprises a convex portion in an extension area, through which the groove portion passes in the case of extending the groove portion in a longitudinal direction.

2. The cutting insert according to claim 1, wherein
the upper surface further comprises a rake face being connected to the first cutting edge and extending toward an inner side from the first cutting edge, and
the convex portion is located at a higher position than the rake face.

3. The cutting insert according to claim 2, wherein the convex portion comprises a pair of inclined side surfaces, the pair of inclined side surfaces being at a lower position from a top portion of the convex portion as approaching a direction extending along the first cutting edge.

4. The cutting insert according to claim 3, wherein at least a part of the pair of inclined side surfaces is located closer to aside of the two small cutting edges than the extension area of the groove portion in the top view.

5. The cutting insert according to claim 3,
further comprising:
a second side surface adjacent to the first side surface;
a second cutting edge located at a second intersection of the upper surface and the second side surface; and
a third cutting edge located at a third intersection of the first intersection and the second intersection and connected to the first cutting edge and the second cutting edge,
wherein the pair of inclined side surfaces is composed of a first inclined side surface and a second inclined side surface, the second inclined side surface being further from the third cutting edge than the first inclined side surface and having a smaller angle of gradient than the first inclined side surface.

6. The cutting insert according to claim 2, wherein the upper surface further comprises a breaking groove in an area that is an inner side relative to the rake face and is further from the small cutting edge than the convex portion, the breaking groove being at a higher position as approaching an inner side.

7. The cutting insert according to claim 6, wherein the breaking groove is connected to the inner side of the convex portion.

8. The cutting insert according to claim 6,
wherein the upper surface further comprises a center portion which is on a center thereof and is at a higher position than the rake face, and
wherein the breaking groove is at a side portion, which is corresponding to the small cutting edges, of an end portion of the center portion.

9. The cutting insert according to claim 3, wherein the convex portion further comprises an inclined center surface, the inclined center surface being located between the pair of inclined side surfaces and being at a higher position as the convex portion comes away from the groove portion.

10. The cutting insert according to claim 9, wherein a width of an end portion, which is closer to the groove portion, of the inclined center surface is smaller than an opening width of the groove portion in the top view.

11. The cutting insert according to claim 9,
further comprising:
a second side surface adjacent to the first side surface;
a second cutting edge located at a second intersection of the upper surface and the second side surface; and
a third cutting edge located at a third intersection of the first intersection and the second intersection and connected to the first cutting edge and the second cutting edge,
wherein the inclined center surface comprises a first edge portion located closer to one inclined side surface of the pair of inclined side surfaces in the top view, the one inclined side surface is closer to the third cutting edge, and
wherein a distance to the first edge portion from the second cutting edge becomes larger as the first edge portion heads for an inner side from the groove portion side, in the top view.

12. The cutting insert according to claim 11, wherein the one inclined side surface, which is closer to the third cutting edge side, of the pair of inclined side surfaces of the convex portion has a larger angle of gradient in comparison with an inclined side surface, which is in a side being further from the third cutting edge, of another convex portion which is closer to a side of the third cutting edge than the convex portion.

13. The cutting insert according to claim 6, wherein the convex portion further comprises an inclined center surface, the inclined center surface being located between the pair of inclined side surfaces and being at a higher position as the convex portion comes away from the groove portion.

14. The cutting insert according to claim 13, wherein a width of an end portion, which is closer to the groove portion, of the inclined center surface is smaller than an opening width of the groove portion in the top view.

15. The cutting insert according to claim 13, further comprising:
   a second side surface adjacent to the first side surface;
   a second cutting edge located at a second intersection of the upper surface and the second side surface; and
   a third cutting edge located at a third intersection of the first intersection and the second intersection and connected to the first cutting edge and the second cutting edge,
   wherein the inclined center surface comprises a first edge portion located closer to one inclined side surface of the pair of inclined side surfaces in the top view, the one inclined side surface is closer to the third cutting edge, and
   wherein a distance to the first edge portion from the second cutting edge becomes larger as the first edge portion heads for an inner side from the groove portion side, in the top view.

16. The cutting insert according to claim 15, wherein the one inclined side surface, which is closer to the third cutting edge side, of the pair of inclined side surfaces of the convex portion has a larger angle of gradient in comparison with an inclined side surface, which is in a side being further from the third cutting edge, of another convex portion which is closer to a side of the third cutting edge than the convex portion.

17. A cutting tool, comprising:
   a holder; and
   a cutting insert which is installed to the holder,
   wherein at least a part of a first cutting edge of the cutting insert protrudes outward over an outer periphery of the holder;
   wherein the cutting insert comprises:
      an upper surface;
      a first side surface; and
      the first cutting edge located at a first intersection of the upper surface and the first side surface,
   wherein the first side surface comprises a groove portion comprising an end portion reaching the upper surface, the end portion of the groove portion configured to divide the first cutting edge into two small cutting edges, and
   wherein the upper surface comprises a convex portion in an extension area, through which the groove portion passes in the case of extending the groove portion in a longitudinal direction.

18. The cutting tool according to claim 17, wherein the cutting insert has a positive axial rake with respect to the holder.

19. A cutting method, comprising:
   moving a workpiece relatively closer to a cutting tool;
   cutting a surface of the workpiece by bringing a first cutting edge of the cutting tool which is rotated, into contact with the surface of the workpiece; and
   separating the workpiece relatively from the cutting tool;
   wherein the cutting tool comprises:
   a holder and a cutting insert which is installed to the holder, the cutting insert comprising:
      an upper surface;
      a first side surface; and
      the first cutting edge located at a first intersection of the upper surface and the first side surface,
   wherein the first side surface comprises a groove portion comprising an end portion reaching the upper surface, the end portion of the groove portion configured to divide the first cutting edge into two small cutting edges, and
   wherein the upper surface comprises a convex portion in an extension area, through which the groove portion passes in the case of extending the groove portion in a longitudinal direction;
   wherein at least a part of the first cutting edge protrudes outward over an outer periphery of the holder.

20. The cutting tool according to claim 19, wherein the cutting insert has a positive axial rake with respect to the holder.

* * * * *